United States Patent [19]

Williams

[11] 4,398,688

[45] Aug. 16, 1983

[54] LEADING EDGE FLAP FOR AN AIRFOIL

[75] Inventor: Arthur L. Williams, Northridge, Calif.

[73] Assignee: Lockheed Corporation, Burbank, Calif.

[21] Appl. No.: 274,851

[22] Filed: Jun. 18, 1981

Related U.S. Application Data

[63] Continuation-in-part of Ser. No. 107,271, Dec. 26, 1979, abandoned.

[51] Int. Cl.³ ............................................. B64C 9/58
[52] U.S. Cl. .................................... 244/207; 244/214
[58] Field of Search ............... 244/213, 214, 219, 216, 244/134 B, 134 C, 207

[56] References Cited

U.S. PATENT DOCUMENTS

| | | | |
|---|---|---|---|
| 1,631,259 | 6/1927 | Gilmore | 244/214 |
| 3,504,870 | 4/1970 | Cok et al. | 244/214 X |
| 3,556,439 | 1/1971 | Autry et al. | 244/214 X |
| 3,831,886 | 8/1974 | Bordges et al. | 244/214 X |
| 4,099,691 | 7/1978 | Swanson et al. | 244/214 X |
| 4,285,482 | 8/1981 | Lewis | 244/214 X |

Primary Examiner—John J. Love
Assistant Examiner—Gene A. Church
Attorney, Agent, or Firm—Lowell G. Turner

[57] ABSTRACT

The invention is a leading edge flap for an airfoil. The leading edge (24) is rotatably mounted to the airfoil (14). A first flap segment is (48) attached to the leading edge (24) and has an external aerodynamic surface (50a) adapted to form a portion of the bottom aerodynamic surface of the airfoil (14), when the flap (20) is in the retracted position. A second flap segment (60) is pivotally attached to the first flap segment (48) and is adapted to be retracted within a recess (80) within the airfoil (14). A link (70) is pivotally connected to both the second flap segment (60) and the airfoil rib structure (22) such that rotation of the leading edge (24) extends the first and second flap segments (48 and 60) from their retracted positions downwardly and forwardly of the leading edge (24), forming an aerodynamic extension of the airfoil (14). In an additional embodiment, the rotatable leading edge is coupled to a source of heated and/or pressurized air, and contains a spanwise duct (26') which is adapted to distribute the air along the airfoil (14) heating the leading edge (24') surface so as to remove or prevent ice forming thereon. A plurality of nozzles in the first flap segment (48') are coupled to the duct (26) and/or the bottom surface (142) and adapted to distribute pressurized air over the top surface of the airfoil (14), providing boundary layer control.

15 Claims, 9 Drawing Figures

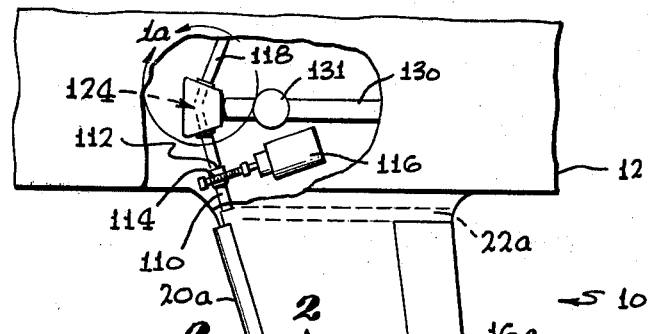
FIG. 1a
FIG. 1
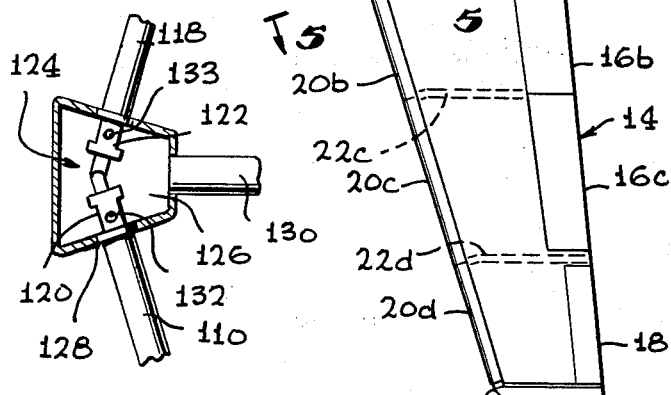
FIG. 2
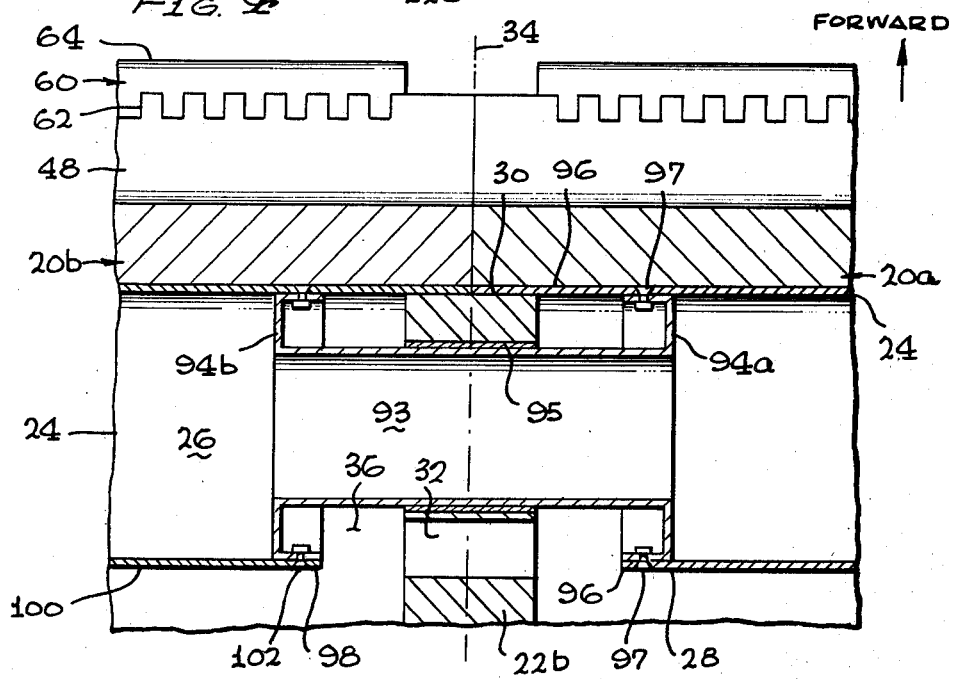

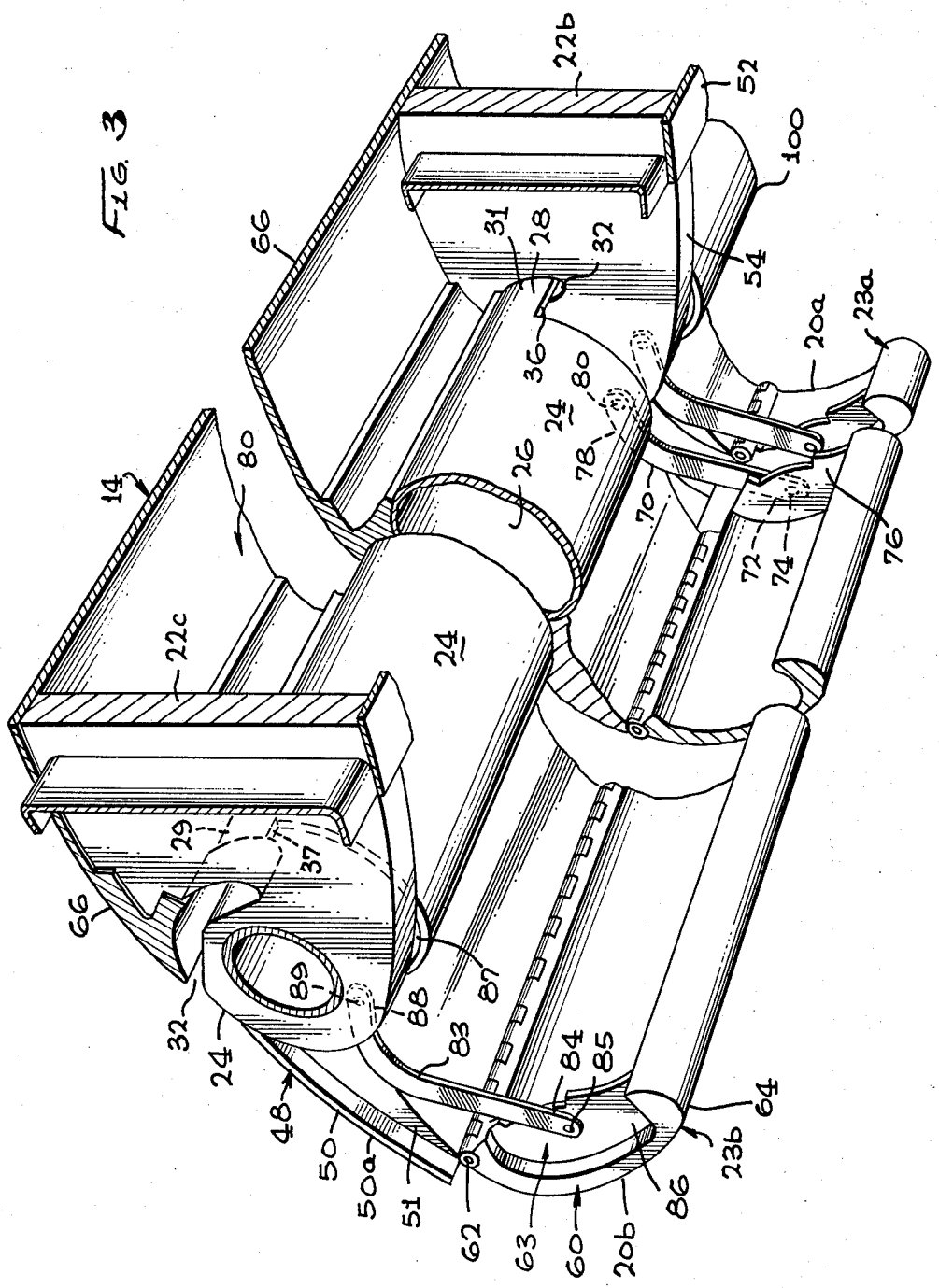

LEADING EDGE FLAP FOR AN AIRFOIL

This is a continuation-in-part of patent application Ser. No. 06/107,271, filed Dec. 26, 1979 now abandoned.

TECHNICAL FIELD

The invention relates to the field of airfoils for aircraft and in particular to a leading edge flap for an airfoil.

The lift of an airfoil, in part, is proportional to its coefficient of lift, its area, and the square of its velocity as it moves through the air. Thus, at cruising speed, the airfoil area and the coefficient of lift required to maintain the aircraft's altitude is considerably less than that required at takeoff or for slow approach landing speeds. Sizing the airfoil for these latter conditions, which exist for only a relatively brief period during a flight, would resuslt in gross inefficiencies during the rest of the flight regime. In such a case, the aircraft would carry the excess weight of the larger airfoil throughout the flight and would be subjected to a large drag penalty because of the greater airfoil surfaace area. The end results would be a reduced payload and higher fuel consumption.

Thus, a major consideration in selecting the size of the airfoil, is the aircraft's primary mission; i.e., conditions to which the aircraft will be subjected over the major portion of the flight. This dictates the use of an airfoil area considerably smaller than that which takeoff distance and landing speed would seem to demand. This problem has been solved in the past by incorporating into the airfoil devices such as leading and trailing edge flaps which can be extended as required, thereby effectively increasing both the airfoil area anad the coefficient of lift by increasing the mean camber line of the airfoil.

BACKGROUND ART

Prior art systems such as U.S. Pat. No. 3,556,439, Method and High Lift Systems for Making an Aircraft Wing more Efficient for Takeoff and Landings, by Charles P. Autrey et al, provide a large increase in wing area and camber by extending and drooping the front portion of the airfoil and further extending a three segment leading edge flap downwardly and forwardly of the leading edge. While having the advantages noted above, such designs have the disadvantage of being extremly complicated and they occupy a considerable amount of space in the wing which could otherwise be used to store fuel.

In order to reduce the volume occupied by a multisegment leading edge flap, past designs have attempted to make use of a portion of the bottom surface of the airfoil as a flap segment. For example, U.S. Pat. No. 3,504,870, Aircraft Wing Variable Camber Leading Edge Flap, by J. B. Cole et al., uses a relatively flat portion of the bottom surface of the airfoil which extends forwardly and downwardly from the leading edge. The flat portion is then warped into an aerodynamic surface by a sophisticated linkage system. While this design reduces the volume occupied by the leading edge flap, it still requires a complex actuation mechanism.

Another approach can be found in U.S. Pat. No. 3,831,886, Airfoil with Extendable and Retractable Leading Edge, by Kenneth P. Burgess et al. In this design, the leading edge is pivoted outwardly and downwardly to form an aerodynamic extension of the airfoil. Its main drawback is that it requires the pivot point to be external of the airfoil's contour. Thus the support linkages must extend downward from the bottom surface of the airfoil, increasing drag. Another drawback of this invention is that only a relatively small increase in wing area is achieved.

Another approach, and quite an old one, is to simply rotate the leading edge of the airfoil, as disclosed in U.S. Pat. No. 1,631,259, Variable Lift, Variable Resistance Airfoil, by W. L. Gilmour. A roughly triangular shaped leading edge is adapted to be rotated to slightly change the camber of the airfoil. While occupying a minimum space, it has little effect on wing area and, as previously mentioned, provides only a small increase in camber.

Another problem of which the prior art leading edge flap designs have not addressed is the provision of means for deicing. The conventional method for deicing a wing is to distribute heated air; for example, by bleeding air from the engines and directing it spanwise along the forward portion of the airfoil to melt any ice forming on the top surface of the airfoil. It is quite difficult to run ducts of sufficient size in an optimum position when using the prior art leading edge flap designs because, as previously mentioned, they have sophisticated linkage systems and/or occupy a considerable amount of the airfoil's volume.

It is also a desirable feature to have some form of boundary layer control typically provided by ejecting air over the top surface of the airfoil. This assures that at any given speed the boundary layer does not separate until a much higher angle of attack and higher coefficient of lift are reached.

The previously mentioned Burgess et al design does provide for boundary layer control. But the very fact that the leading edge is translated forward requires a flexible connection between the leading edge and the air supply ducts. This has disadvantages in that such flexible connections are subject to fatigue failure.

From the foregoing, it can be seen that it is a primary object of this invention to provide a leading edge flap that can be stored within the airfoil in a minimal space when retracted. This is accomplished while still providing, when the flap is extended, a significant increase in wing area and camber, as well as a larger effective leading edge radius than is provided by leading edge flaps which are pivoted at or near the leading edge.

It is also an object of this invention to provide a leading edge flap having a simplified actuation system, with all hinge brackets and actuators being located inside the airfoil contour.

A further object of this invention is to provide a leading edge flap having provisions for deicing the airfoil.

A still further object of this invention is to provide a leading edge flap having provisions for boundary layer control.

DISCLOSURE OF INVENTION

The invention is an extendable and retractable leading edge flap for an airfoil. The airfoil incorporates a rotatably mounted leading edge. A first flap segment is attached to the leading edge and has an external aerodynamic surface adapted to form a portion of the bottom aerodynamic surface of the airfoil when the flap is in the retracted position. A second flap segment is pivotably attached to the first flap segment and is adapted to be stored within a recess within the airfoil behind the rotatable leading edge when the flap is retracted. A link is pivotably connected at one of its ends to the second flap segment and at its other end to the airfoil structure such that rotation of the leading edge extends the first and second flap segments from their retracted positions downwardly and forwardly of the leading edge to form an aerodynamic extension of the upper surface of the airfoil, thereby increasing both the aerodynamic surface area and camber of the airfoil and increasing its lifting capacity.

In a second embodiment, the rotatable leading edge is coupled to a source of heated air and contains a spanwise duct adapted to distribute the heated air along the airfoil to heat the upper surface, preventing ice from forming thereon or removing that already formed.

In a third embodiment, the rotatable leading edge is coupled to a source of pressurized air and contains a spanwise duct for distributing the air along the airfoil. The first flap segment incorporates a plurality of nozzles coupled to the duct and adapted to distribute the pressurized air over the top surface of the airfoil, providing boundary layer control when the leading edge flap is in the extended position.

In a fourth embodiment, the first flap segment incorporates a passageway connecting the bottom surface with the upper surface of the airfoil so that the relatively high pressure air in the vicinity of the lower surface is ejected over the upper surface for boundary layer control during flight.

The novel features which are believed to be characteristic of the invention, both as to its organization and its method of operation, together with further objects and advantages thereof, will be better understood from the following description, taken in connection with the accompanying drawings in which presently preferred embodiments of the invention are illustrated by way of example. It is to be expressly understood, however, that the drawings are for purposes of illustration and description only and are not intended as a definition of the limits of the invention .

BRIEF DESCRIPTION OF DRAWINGS

FIG. 1 is a partial planform view of an aircraft showing a portion of the fuselage and an airfoil;

FIG. 1a is an enlarged view of the universal joint within the circle 1a in FIG. 1;

FIG. 3 is a schematic perspective view of the leading edge flap in the extended position taken in the direction of arrow 3 shown in FIG. 2;

FIG. 4 is schematic cross-sectional view through the supporting rib structure of the leading edge flap looking downward along the line 4—4 in FIG. 2 and rotated 90°;

BEST MODE FOR CARRYING OUT THE INVENTION

Figure 2:
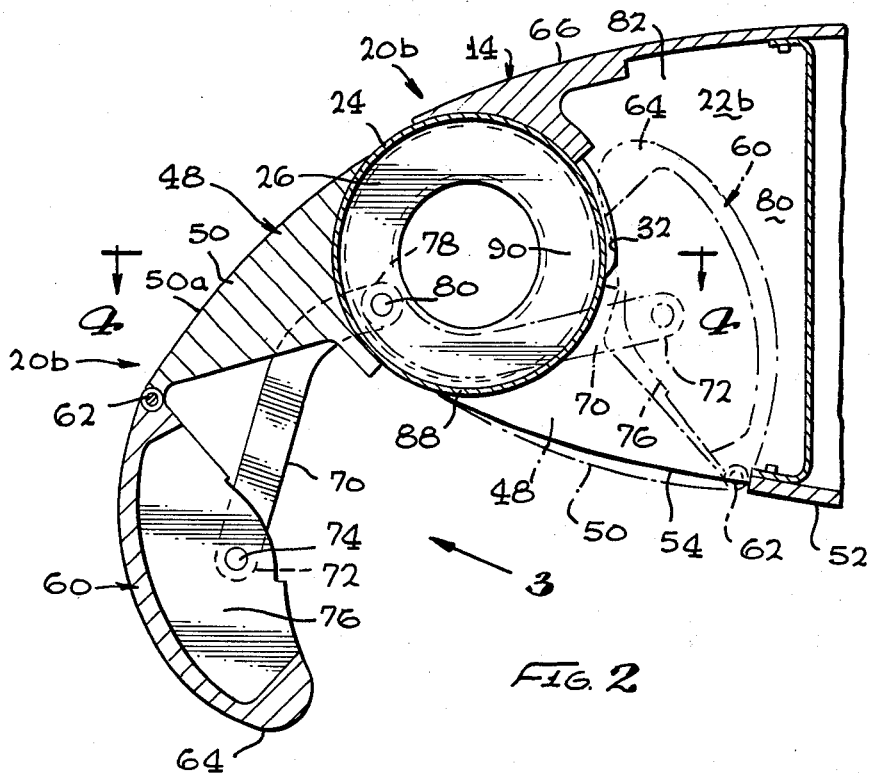
FIG. 2 is a schematic cross-sectional view of the leading edge flap in the extended position, looking inboard toward the fuselage along line 202 of FIG. 1, with the leading edge flap shown in the retracted position by broken lines.

Referring to the details of the drawings, FIG. 1 shows a partial planform view of an aircraft, designated by numeral 10, having a fuselage 12 and a typical three-dimensional airfoil 14. The airfoil 14 includes trailing edge flaps 16a, 16b and 16c. These flaps are extended during takeoff and landing to increase both the area and camber of the airfoil 14. An aileron 18 is provided for roll control. In order to further increase the area and camber of the airfoil 14, it is desirable to incorporate a plurality of leading edge flaps, designated by numerals 20a, 20b, 20c and 20d and shown here in their extended positions, supported by rib structures 22a, 22b, 22c, 22d and 22e in a manner to be subsequently described. The mechanism shown in the fuselage interior will also be described later.

Figure 5:
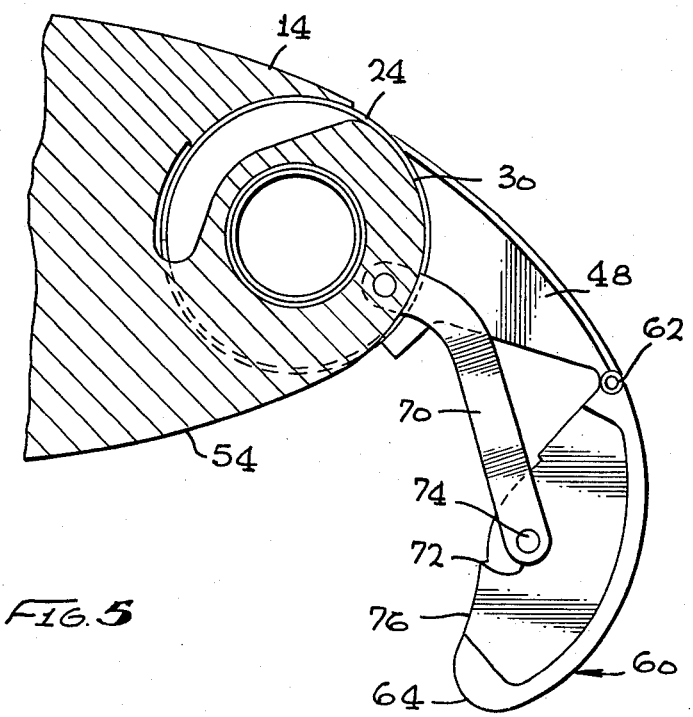
FIG. 5 is a schematic cross-sectional view through the supporting rib structure of the leading edge flap, looking outboard along the line 5—5 of FIG. 1.

Illustrated in FIG. 2 is a cross-sectional view of the leading edge flap 20b of FIG. 1. This view, taken together with the views of FIG. 3 from beneath the airfoil 14 and looking upward and forward toward the flap 20b, and with additional reference to FIGS. 4 and 5, it can be seen that flap 20b consists of a torque-transmitting, preferably tubular, rotatable leading edge 24. It is shown as being cylindrically shaped, although other shapes can be used. Preferably also, this torque tube configured leading edge edge 24 inherently incorporates a duct 26 for the dual purpose of reducing weight and conducting heated air from the aircraft engines (not shown) through the leading edge structure for both anti-icing of the airfoil 14 in the vicinity of the leading edge 24 and for boundary layer control, both as further described hereinafter.

Each of ends 28 and 29 (FIG. 3) of the leading edge 24 includes a portion 31 which extends over a front surface 30 (FIGS. 4 and 5) of the adjacent ribs, sliding partially into a curved slot 32 contained within the respective ribs 22b and 22c and extending approximately to the centerline 34 thereof (FIG. 4) in juxtaposed relation to define a substantially continuous surface over the entire length of the leading edge. The ends 28 and 29 contain notches 36 and 37 so that when the leading edge 24 rotates it will clear the rib structures 22b and 22c.

Upon the leading edge 24 is a first flap segment 48, attached by welding, riveting or other conventional attachment means, to the surface of the leading edge torque tube 24. It has an outer surface panel, which is usually of curved configuration and which has an aerodynamic surface 50a. The flap segment 48 is supported in this position by a support structure 51, which may be a solid support, as illustrated in FIG. 3, but which usually comprises a plurality of individual ribs (not shown). The surface 50a is faired tangentially with respect to the surface of the leading edge 24 with a smooth, aerodynamically clean transition therebetween. The panel 50, with its surface 50a, extends over the entire length of the leading edge 24. It defines a portion of and blends smoothly with a lower aerodynamic surface 52 of the airfoil 14 when the flap 20b is in the retracted position (shown in broken lines in FIG. 2).

The rib structure 22b (typical of other such ribs) normally is provided with a recess of indentation 54, having a depth approximately equal to the thickness of the panel 51 to provide a smooth aerodynamic contour for support and rigidization of the leading edge 24 and the surface 52 when the flap 20b is in the retracted position.

A second flap segment 60 is pivotally connected to the segment 48, typically by means of a piano-type hinge 62. The segment 60 incorporates an outer aerodynamic surface 64, defined upon the outer periphery of a structure 63. When this second flap segment 60 is in its extended position, its surface 64 defines a further extension of the surface 50a, of the first flap segment 48, and the surface of leading edge 24. Thus, it combines with segment 48 to, in substance, provide a smooth aerodynamic surface, blending in a continuous pattern with the upper aerodynamic surface 66 of the airfoil 14, to increase both the camber and the aerodynamic surface area of that airfoil.

The width of the primary structural portion of the segment 48 is slightly less than the distance between the rib structures 22b and 22c, such that it nests snugly therebetween, the surface panel 50 defining an essentially continuous portion of the airfoil 14 when the segment is retracted.

A linkage means is defined by a link 70 pivotally connected at its first end 72 by a pin 74 to a reinforcing rib 76 mounted on the inner side of the segment 60. The link 70 extends through the notch 36 in the end of the tubular member defining the leading edge 24. It is pivotally connected at its second end 78 by a second pin 80 to the rib structure 22b. Thus, the first segments 48, the second segment 60, the link 70, and the rib structure 22b form the entire linkage means, which is essentially a four bar linkage system that controls the path of the segment 60 from its extended position to its retracted position. When stored, the segment 60 is enclosed within a recess 82 defined in the nose section of the airfoil 14 located directly behind the leading edge tube 24. As the leading edge tube 24 rotates counterclockwise, as in FIGS. 2 and 3, the segment 48 is also rotated, eventually residing in a position such that the surfaces 50 and 52 blend with the leading edge tube 24 to provide the aerodynamically smooth leading edge for the airfoil illustrated in the dotted line position of FIG. 2. This achieves the retracted leading edge condition for cruise and high speed flight.

The outboard end 23b of the flap 20b is typically supported in a manner similar to the inboard side 23a to provide redundant support. Thus, a link 83 is pivotally connected at its first end 84 by means of pin 85 to the reinforcing rib 86 of segment 60. It extends through a notch 87 in the adjacent end of the leading edge tube 24, and connects at its second end 88 to the rib structure 22c by means of pin 89.

Referring in particular to FIG. 4, a hollow transition tube 93 is shown. It is provided for the purpose of connecting adjacent leading edge flaps to one another and is typical of those used in several locations. Having first and second flanges 94a and 94b, respectively, this transition tube is rotatably mounted in a bearing ring 95 which is supported by the rib structure 22b. The first flange 94a, through a first outer tubular member 96 integral with the flange, is coupled to the end 28 of the leading edge tube 24, by means of a plurality of fasteners 97. Similarly, the second flange 94b, through a second outer tubular member 98, which is integral with the flange 94b, is coupled to a rotatable leading edge tube 100 of the flap 20b, by means of fasteners 102. Thus, rotation of the leading edge tube 100 will cause the leading edge tube 24 of flap 20b to rotate in unison with that of the flap 20a. The flap segments 20c and 20d are connected in a like manner to rotate in unison with segments 20a and 20b.

As shown in FIG. 4, the diameter of the tube 93 is less than that of the leading edge tubes 24 and 100. This provides the advantage of allowing the leading edge tubes 24 and 100 to circumscribe an outer end 30 of the rib structure 22b and the flanged tube 93, as previously described. If the tube 93 were the same diameter as the leading edge tubes 24 and 100, the outer edge 30 of the rib structure 22b would have to extend forward of the leading edge 24. This would cause a discontinuity along the airfoil 14 because of the necessity of providing mounting support for the leading edge 24, thus reducing the area of segment 48. Furthermore, the reduction in diameter of the tube 93 is necessary to provide for the attachment of the link 70 to the rib structure 22b (see FIGS. 2 and 3).

Referring again to FIGS. 1 and 3, the leading edge tube 100 of flap 20a extends to the rib structure 22a and is coupled by a transition tube (not shown), in the manner previously described, to a tube 110 which extends into the fuselage 12. A gear 112, mounted upon the tube 110, engages a worm gear 114 coupled to a hydraulic motor 116. The motor 116 is coupled to a hydraulic control system (not shown) which is adapted, upon receiving proper control signals, to drive the worm gear 114. Thus, all the flaps 20a-20d are activated simultaneously. It must be understood that many other methods of rotating the tube 110 could be used in the practice of this invention. For example, the motor 116 could be electrically powered or the tube 110 could be connected to a hydraulic cylinder through appropriate linkage (not shown) which could also be used to rotate the tube 110.

A tube 118 is coupled to the leading edge tube of the leading edge flaps on the opposite airfoil (not shown). An end 120 (FIG. 1a) of the tube 110 may be coupled to an end 122 of tube 118 by a schematically illustrated, conventional universal joint 124. Thus, it is insured that the leading edge flaps of both airfoils are extended or retracted in unison.

Since the rotating leading edge tubes 24 and 100 of the flaps 20b and 20a, respectively, contain ducts, as do also the leading edge tubes of the other flap segments 20c and 20d, these leading edge ducts can be used to conduct heated air along the airfoil 14 for anti-icing purposes. This is accomplished by enclosing ends 120 and 122 of tubes 110 and 118, respectively, together with the universal joint 124, in a plenum chamber 126 and sealing off the tube ends by conventional rotary seals 128 mounted on the chamber 126 tube outlets. Coupled to the chamber 126 is a duct 130. This duct is connected to a source of high pressure air, such as bleed air from the engines (not shown) of the aircraft 10. A valve 131 is incorporated into the duct 130 for control of the flow of bleed air. Air from the duct 130 enters ports 132 and 133 in the tube ends 120 and 122. Alternately, air can enter through ports (not shown) in the universal joint 124. Thus, regardless of the position of the leading edge flaps 20a, 20b, 20c, and 20d, and those of the opposite airfoil, heated air can be ducted spanwise along the airfoil 14 to heat the leading edges so as to remove or prevent ice forming on the leading edge 24 and surface 66. The air may be discharged by conventional means (not shown) at the outer end of the wing.

Figure 6:
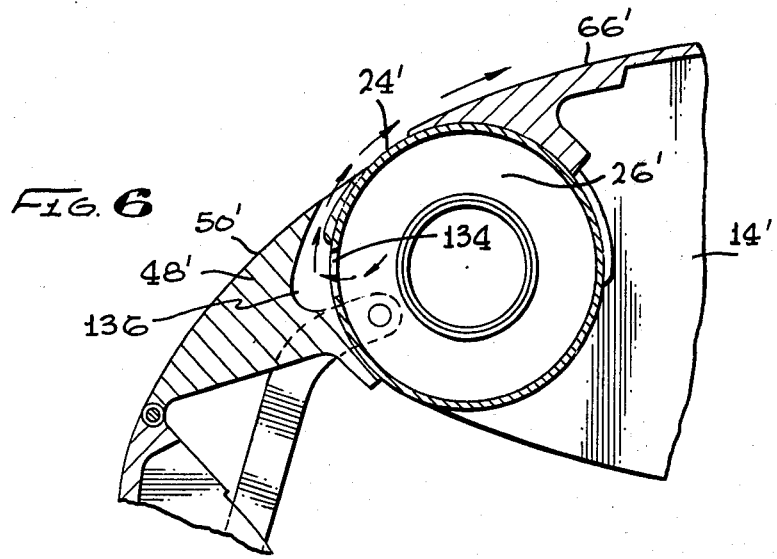
FIG. 6 is a partial cross-sectional view of the leading edge flap in the extended position looking inboard toward the fuselage along line 2—2 of FIG. 2 and illustrating a method of providing boundary layer control.

In FIG. 6 is a cutaway portion of FIG. 2 modified to illustrate another embodiment of the invention wherein provisions are made for boundary layer control. This is accomplished by making use of a source of high pressure air; for example, bleed air from the engines (not shown) of the aircraft 10. The rotating leading edge tube 24' incorporates along its span a plurality of ports 134 (one only shown) coupling the duct 26' with a plurality of ducts 136 (one only shown) located spanwise in the first flap segment 48'. The ducts 136 are shaped as nozzles adapted to direct air over the upper aerodynamic surface 66' of the airfoil 14' at the juncture of the leading edge tube 24' and the outer aerodynamic surface 50' of segment 48'. In operation, the air can be supplied by a system similar in operation to that used for anti-icing, as described above. Thus, both anti-icing and boundary layer control can be achieved independently or simultaneously.

The boundary layer control effect achieved by ejecting the heated air over the airfoil surface 66' at any given aircraft velocity, is to energize the normal airflow over said surface 66'. This delays separation of the flow until after a higher angle attack is reached than could be achieved without boundary layer control. Alternately, with boundary layer control the aircraft stall speed at this higher angle of attack can be reduced.

Figure 7:
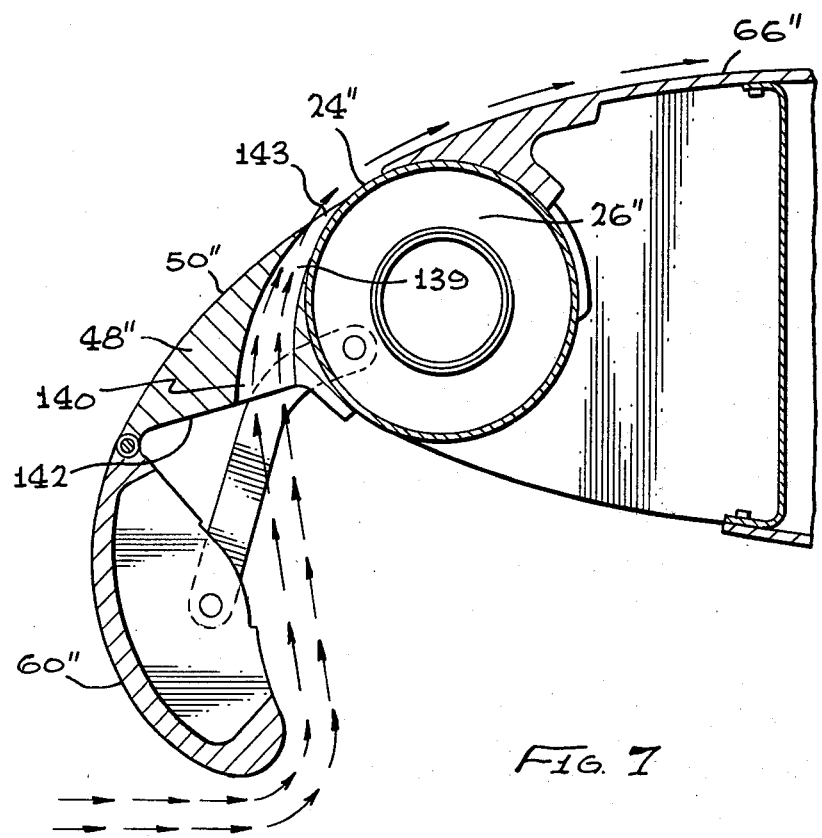
FIG. 7 is a cross-sectional view of the leading edge flap in the extended position looking inboard toward the fuselage along line 2—2 of FIG. 2 and illustrating a second method of providing boundary layer control.

Illustrated in FIG. 7 is a cross-sectional view similar to FIG. 2, but showing an alternate method of achieving boundary layer control. In this embodiment, the first flap segment 48" incorporates a plurality of passageways 139 (one only shown) having an entrance 140 located on the underside 142 of the segment 48". This passageway tapers to an output nozzle 143 at the juncture of the outer aerodynamic surface 50" of the segment 48" and the leading edge 24".

When the aircraft 10 is in flight, the free stream air flowing under and around the second flap segment 60" near the underside 142 of the segment 48" becomes somewhat stagnant, and thus, exits at a higher pressure than the air flowing over the surface 50" and the upper aerodynamic surface 66". This difference in pressure (P) results in the induction of a flow upward through the passageway 139 and over the surface 66", energizing the air normally flowing over said surface, providing boundary layer control, similar to that described in relation to FIG. 6.

Figure 8:
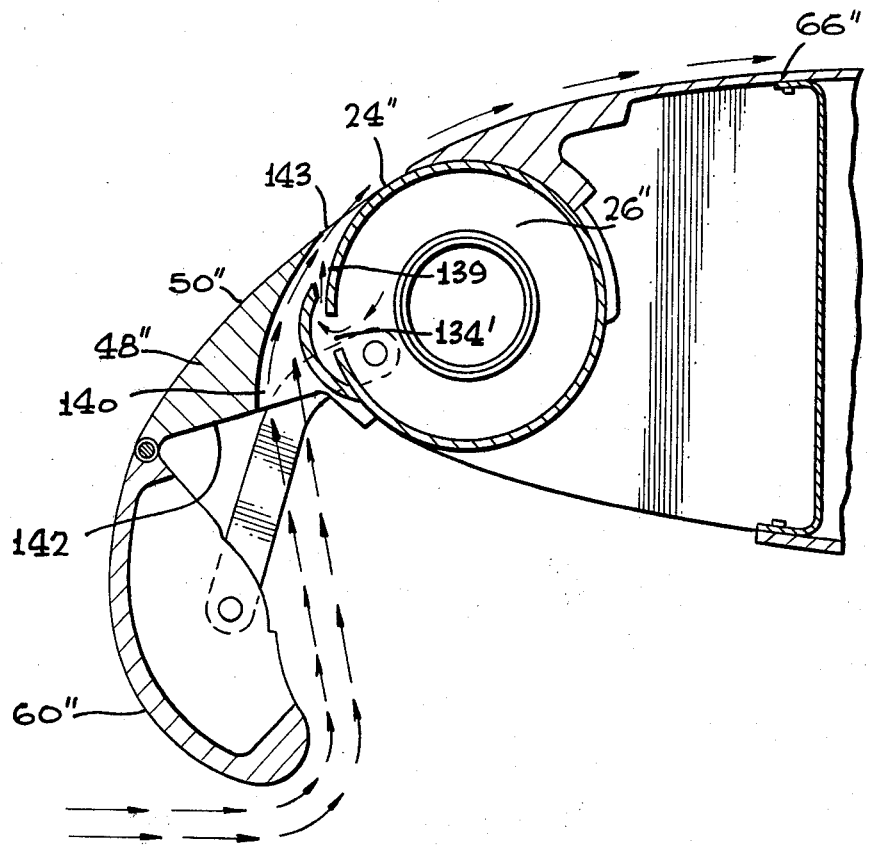
FIG. 8 is a cross-sectional view similar to FIG. 7, of a structural variation thereof.

FIG. 8 is a cross-sectional view similar to FIG. 7. It illustrates a configuration which is basically a modification of FIGS. 2 and 7 whereby an augmentation of the low pressure, relatively slow moving air by the high pressure, high velocity air available for boundary layer control is accommodated. Therein, not only is the relatively slow moving air from under the double flap available to exit through the passageways 139 and over the upper aerodynamic surface 66", energizing the normal flow of air thereover, but that relatively low pressure source may be augmented by a secondary high pressure source of air from the duct 26". Air flowing from this duct, exiting through a plurality of ports 134', is deflected upward by a baffle element 144, where it merges with the flow of air through the passageways 139, thereby augmenting the amount of boundary layer control air otherwise available.

While the leading edge flap has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

Industrial Application

The leading edge flap system is useful on aircraft to provide increased lift during take-off and landing as well as to provide a method of leading edge anti-icing.

I claim:

1. An extendable and retractable leading edge flap for an airfoil comprising:
   a leading edge of the airfoil permanently located and rotatably mounted thereupon;
   a first flap segment attached to said leading edge for rotation therewith and defining a portion of a lower surface of the airfoil when said flap is in a retracted position;
   a second flap segment pivotally attached to said first flap segment and adapted to be stored within said airfoil when said second flap is in the retracted position; and
   linkage means pivotally connecting said second flap segment and said airfoil;
   whereby the rotation of said leading edge actuates said linkage means and extends said first and second flap segments form their retracted positions downwardly and forwardly of said leading edge, defining an aerodynamic extension of the upper surface of said airfoil and increasing its lift capacity.

2. The leading edge flap of claim 1 wherein said leading edge comprises:
   torque means extending spanwise along the airfoil for moving with and causing the extension and retraction of said first and second flap segments.

3. The leading edge flap of claim 1 wherein said rotatable leading edge comprises:
   a torque tube, including a spanwise duct coupled to a source of heated air, said duct adapted to conduct said heated air spanwise along said leading edge for anti-icing said airfoil.

4. The leading edge flap of claim 3 wherein said torque tube comprises:
   a plurality of tube segments interconnected for coextensive rotation and having ends, at least a portion of which ends are juxtaposed to define a substantially continuous surface over the length of said leading edge irrespective of the interposition of structural rib sections within the airfoil.

5. The leading edge flap of claim 1 wherein said first flap segment comprises:
   aerodynamic surface means pivotally connected to said leading edge, oriented tangentially with respect to a surface of said leading edge and providing a substantially aerodynamically clean and tangential transition between said structure and said leading edge, said surface of said structure also defining an extended portion of and blending with an under surface of the airfoil when said flap is retracted; and
   a support structure affixed to, structurally supporting said aerodynamic surface means and sustaining its surface shape, and attaching the same fixedly to said leading edge.

6. The leading edge flap of claim 1 or 5 wherein said second flap segment comprises:

a structural member pivotally connected to an extremity of said first flap segment and having an outer aerodynamic surface, extendable from said first aerodynamic surface to define therewith a substantially smooth and continuous aerodynamic surface with said leading edge when said first and second segments are extended.

7. The leading edge flap of claim 6 wherein:
said airfoil incorporates a plurality of reinforcing ribs in spaced relation along its leading edge, and
said linkage means comprises at least one double ended link member pivotally connected at its respective ends to said second flap segment and to a said reinforcing rib, and
actuating means is actuatably connected to said leading edge to rotate the same and to cause said flap to be extended and retracted through the action of said linkage means.

8. The leading edge flap of claim 3 wherein:
a plurality of said leading edge segments,
a plurality of said first flap segments, and
a plurality of said second flap segments are provided along the length of the airfoil to define a plurality of flap portions adapted for simultaneous operation within the assembly.

9. The leading edge flap of claim 8 wherein:
said leading edge segments are axially aligned and are interconnected at their adjacent ends by additional tubular means to transmit heated air from one segment to the next along the entire leading edge.

10. The leading edge flap of claim 1 wherein said leading edge comprises:
a spanwise torque-transmitting duct coupled to a source of pressurized air, said duct adapted to conduct said air spanwise along said leading edge, and
nozzle means coupled to said duct adapted to eject said air from said duct spanwise over an upper surface of said airfoil for boundary layer control when said leading edge is in the extended position.

11. The leading edge flap of claim 10 wherein:
said slots are defined in a portion of said first segment adjacent said leading edge.

12. The leading edge flap of claim 9, wherein:
said nozzle means includes,
a plurality of slots located spanwise along said leading edge and terminating in nozzles adapted to direct said pressurized air over the upper surface of the airfoil when said leading edge flap is in said extended position, and
said rotating leading edge includes ports connecting said duct to said slots.

13. The leading edge flap of claim 1 or 3 wherein:
said first flap segment includes a plurality of passageways, located spanwise along the airfoil, connecting said bottom surface with said upper surface of said airfoil such that, during flight, relatively higher pressure in the vicinity of said lower surface is ejected over said upper surface for boundary layer control during flight when said leading edge flap is in the extended position.

14. The leading edge flap of claim 1 or 3 wherein:
said first flap segment includes a plurality of passageways terminating as nozzles, located spanwise along the airfoil and connecting said bottom surface with said upper surface of said airfoil such that, during flight, relatively higher pressure in the vicinity of said lower surface is ejected over said upper surface for boundary layer control during flight when said leading edge flap is in the extended position, and
said leading edge is a torque tube containing a continuous spanwise passage therethrough, said torque tube containing a plurality of ports connecting said continuous passage to said plurality of passageways to direct pressurized air thereinto and augment the amount of relatively higher pressure air available for boundary layer control purposes.

15. The leading edge flap of claim 14, wherein baffle means if provided adjacent each of said ports to direct air flowing therethrough toward said nozzles.

* * * * *